UNITED STATES PATENT OFFICE.

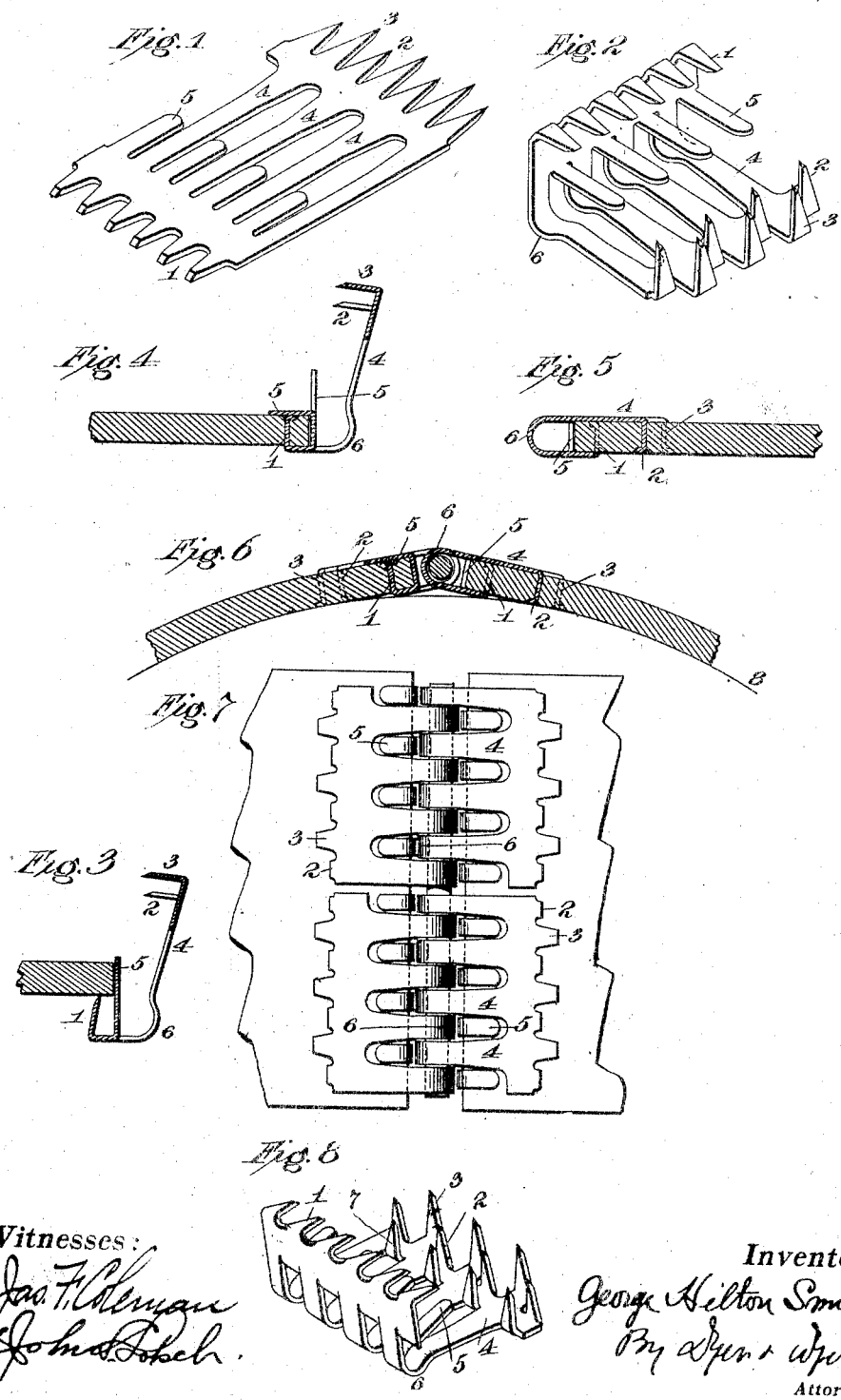

GEORGE HILTON SMITH, OF EASTON, PENNSYLVANIA, ASSIGNOR TO ACME BELTING COMPANY, A CORPORATION OF NEW JERSEY.

BELT-FASTENER.

No. 928,556.   Specification of Letters Patent.   Patented July 20, 1909.

Continuation of application filed December 17, 1906, Serial No. 348,231. This application filed April 23, 1907. Serial No. 369,767.

*To all whom it may concern:*

Be it known that I, GEORGE HILTON SMITH, a subject of the King of Great Britain, residing at Easton, county of Northampton, State of Pennsylvania, United States of America, have invented an Improved Belt-Fastener, of which the following is a specification.

The object I have in view is the production of a fastener for power, conveyer and other belts, which will be durable, extremely strong, cheap to manufacture and easily attached to the belt.

Further objects will appear from the following specification and accompanying drawings taken together or separately.

This application is a continuation of an application for patent filed by me December 17, 1906, Serial No. 348,231.

I attain these objects by the device illustrated in the drawings, in which—

Figure 1 is a perspective view of a stamping from which the belt fastener embodying my invention is made. Fig. 2 is a perspective view of the same fastener bent to the shape it assumes before being attached to the belt. Fig. 3 is a view in section of the end of a belt and a fastener showing the parts in position before any of the prongs of the fastener are driven into the belt. Fig. 4 is a view in section of the end of a belt and a fastener applied thereto, the parts being in the second position they assume during the operation of attachment. Fig. 5 is a similar view showing the fastener permanently attached to the end of a belt. Fig. 6 is a section of two ends of a belt connected together and on a pulley showing the pintle in place. Fig. 7 is a top view of the same showing two fasteners for each end of a belt, which belt is wider than one fastener; and Fig. 8 is a perspective view of a modified form of the fastener shown in Fig. 2.

In all the views like parts are designated by the same reference characters.

In carrying out my invention, I make, by stamping or otherwise, a member of a single piece of material, preferably sheet metal with integral prongs. Each fastener is made of two members, each of a single piece, as shown in Fig. 1, the two members each being connected to an abutting end of the belt to be fastened, and the two members being secured together by a pintle.

Each member comprises a plate having a series of projections or prongs 1 at one extremity, and a series of alternate short and long projections or prongs 2 and 3 at the other extremity. Between the projections the material is cut away, forming bars 4—4 and alternate recesses. Within each recess, and extending part of the length thereof, is a projection or finger 5. The material between the base of the projections 1 and 5 is left solid for a space of about the thickness of the belt to which the fastener is to be attached. Between the base of the prongs 2 and 3 and the bars 4, the material is left uncut a sufficient distance in order to form a foundation or backing for the prongs 2 and 3. The sides of the prongs 1 are shown as tapering to a chisel-edge as shown in Figs. 1 and 2, or to a point as shown in Fig. 8 so that they may be easily driven into the belt. The prongs 2 and 3 also taper for the same reason.

The blank shown in Fig. 1 may be formed in a single operation by stamping. It is then, either in the same or in a subsequent operation, bent to the form shown in Figs. 2 and 3. The bars 4—4 are bent at substantially a right angle, the point of bending being adjacent to the fingers 5. The bend is preferably made upon a gradual sweep so as to form a curve 6. The curve is made for the purpose of reducing friction where the pintle engages. The fingers 5—5 are bent abruptly at a right angle to the base of the member and in the same direction in which the bars 4—4 are bent. The prongs 1—1 are also bent at an angle to the base so that they will be nearly parallel to the fingers 5—5. The angle of bend is slightly less than a right angle, so that the prongs 1 will slightly incline toward the finger 5. The prongs 2—3 are bent upward at an angle to the base, as shown in Figs. 2 and 3. The angle of bend is also preferably slightly less than a right angle, so that the prongs 2 and 3 will incline slightly toward the curve 6. The short prongs 2—2 are bent close to the body of the member and the longer prongs 3—3 at a greater distance away so that the ends of the prongs 2 and 3 will project substantially the same distance beyond the base of the member when the latter is bent to the position shown in Figs. 2 and 3. The prongs 1, 2 and 3 are adapted to be driven through the belt and are clenched. The fingers 5 constitute a means for alining the member to the end of the belt and also for assisting it in being secured thereto.

The fasteners, as shown in Figs. 2 and 3, are in the form in which they are marketed. They are to be applied to the ends of the belt by the purchaser. In the modification, shown in Fig. 8, the prongs 2 and 3 are reinforced by an additional set of prongs 7, which are best made parallel to the prongs 2 and 3. These additional prongs are made to lie between the bars 4—4. This form of fastener has a somewhat stronger anchorage than that previously described, and is desirable for use in connection with heavier belts.

The manner in which the fasteners are secured to the belt is shown in Figs. 3, 4 and 5. A member is applied to the end of the belt by engaging the edge of the latter with the fingers 5, the points of the prongs 1—1 resting upon one of the sides of the belt, as shown in Fig. 3. The fingers 5 serve as a means for alining the members and the end of the belt and prevent the members being put too close to the end of the belt. The prongs 1 are now driven into the side of the belt. The inclination of the prongs 1 is important, as there is a tendency of the member to tilt upon the anvil while the prongs are being driven into the belt, which tilting causes the prongs to pass directly through the belt on a line at right angles to its two sides. Were the prongs not so inclined they would be driven in diagonally owing to the tilting of the member, which would be undesirable, as the prongs would have an imperfect hold within the belt and would be unable to carry as great a load. That portion of the fingers 5 which extends above the belt will now be bent down over the end of the belt engaging with the upper face of the latter. As shown in Fig. 4, one of the fingers 5 is shown bent to this latter position, and another is shown in the original unbent vertical position. After the fingers 5 are bent down over the upper face of the belt, the ends of the prongs are clenched. The member is now bent at the curve 6, so that the prongs 2 and 3 can be driven into the other side of the belt. In order to keep the opening at the curve 6 of the proper size and shape to allow the pintle to turn within it, the pintle can be placed in that position when the fastener is being bent, or a mandrel may be introduced for the purpose of defining the curve to the shape of the pintle. The prongs 2 and 3 being driven through the belt, they will have their sharp extremities clenched within the lower side of the belt, as shown in Fig. 5. The other end of the belt will be provided with a similar member, and the two will be secured together by means of a pintle 7. The clenching may be done in any way, as by means of a hammer and an anvil.

As many fasteners as are desired may be used. As shown in Fig. 7, two members on each end of the belt are employed. They may be made wider or narrower than shown, and the number for each belt is unlimited.

As shown in Fig. 7, the fingers 5 rest in the recesses between the bars 4, so that a substantially unbroken metal surface is produced on this side. The other side will also be an unbroken metallic surface. This adds greatly to the life of the fastener.

Another important feature of my invention resides in making the fastener with a grasp on both sides of the belt through a connection which extends along both sides of the belt and away from the end of the belt, one of such connections being longer than the other.

Referring to Fig. 6, it will be seen that that portion of the member which carries the prongs 2 and 3 extends a greater distance from the end of the belt than that portion which carries the prongs 1. This is a very important improvement as it gives an anchorage on both sides of the belt and at the same time keeps the fastener away from the pulley. As shown in Fig. 6, the pulley 8 comes in contact with the belt only and not with any portion of the fastener, at least, with only a small portion of that part of the fastener which carries the prongs 1—1. Therefore there will be no objectionable blow caused by a large portion of the fastener coming into contact with the pulley, which would be the case if the fastener extended equally on both sides of the belt, or of the weak and inadequate anchorage if the fastener extended on one side only of the belt.

The bars 4 adjacent to the end of the member that carries the prongs 2 and 3 are best increased in width, the sides of the cut-away portions being made on curved lines, as shown, so as to secure as great an amount of material at this point as is possible. By making the prongs 2 and 3 of different lengths a staggered construction is produced so that contiguous prongs do not pass through the belt on the same straight line. This prevents the sides of the prongs from cutting the sides of the belt, and therefore results in a very much stronger construction.

Any tendency of the fastener to pull away from the end of the belt is resisted by the engagement of the prongs 1, 2 and 3. The prongs 1 are reinforced in their grip on the belt by the fingers 5, which effectually prevent the prongs 1 from pulling out of the end of the belt. The fastener is best made of metal sufficiently stout so that it will have enough stiffness to retain the shape given to it when it is applied to the end of the belt.

Any tendency, however, to straighten it out and distort it will be resisted by the anchorage of the prongs 1, 2 and 3 within the end of the belt.

By means of the fingers 5—5, the fastener may be alined perfectly upon the end of the belt without the need of any tool. This is important as it insures the introduction of the prongs 1 into the proper place on the belt. Without the fingers there would be liability of the prongs being entered too near the end of the belt. There would also be liability of the prongs being entered too far from the end of the belt, thus interfering with the proper location of the pintle. Were the prongs too near the end of the belt, insufficient anchorage for the fastener would be the result. The fingers 5, after being bent over the sides of the belt also assist in holding the prongs 1 in position and prevent their being drawn out.

The fastener has an additional advantage. By making it of sheet metal of adequate strength, I find that its weight is substantially equal to the weight of that portion of the belt which is displaced by the presence of the fastener. This similarity of weights of belt and fastener is made possible by the structure which permits engagement with both sides of the belt and anchorage in three or more places. The fastener is therefore made very light, so that it will weigh no more than that portion of the belt displaced by the fastener; therefore, that portion of the belt carrying the fastener will travel as easily and turn as freely as any other, all portions of the belt weighing the same.

In attaching the fastener to the belt, it is advisable to apply the member or members to one end of the belt before applying them to the other end; for instance, where two fasteners are shown, as in Fig. 7, two of the members are first applied to one end of the belt, and then these are used to aline the other two members to the other end of the belt. By taking this precaution there is no danger of the fasteners being incorrectly alined.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent, is:

1. A belt fastener which is adapted to be bent around a pintle and formed of sheet metal with prongs and alining fingers at one end and staggered prongs at the other end.

2. A belt fastener formed of sheet metal with prongs at each extremity, and alternate bars and alining fingers between the extremities; the bars being bent upon themselves at substantially a right angle and the fingers bent to lie substantially parallel to the major portion of the bars and the prongs bent at an angle to their bases.

3. A belt fastener having integral prongs and alining fingers at one end, the said alining fingers being adapted to be bent around the end of the belt, thereby constituting a fastening additional to the prongs.

4. In a belt-coupling a pair of members each comprising a body portion and a plurality of projections formed integrally therewith, said projections being bent at right angles to the plane of the body portion to form a stop for the belt and having a portion bent over the belt, substantially as described.

5. In a belt-coupling a pair of members each comprising a body portion and a plurality of projections formed integrally therewith, said projections being bent at right angles to the plane of the body portion to form a stop for the belt, and then parallel therewith, substantially as described.

This specification signed and witnessed this fifteenth day of April, 1907.

GEORGE HILTON SMITH.

Witnesses:
JOHN BRUNNER,
A. S. TEMPLIN.